(12) United States Patent
Chappo et al.

(10) Patent No.: US 10,527,739 B2
(45) Date of Patent: Jan. 7, 2020

(54) QUANTUM DOT BASED IMAGING DETECTOR

(71) Applicant: KONINKLIJKE PHILIPS N.V., Eindhoven (NL)

(72) Inventors: Marc Anthony Chappo, Elyria, OH (US); Dane Pittock, Lyndhurst, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/745,171

(22) PCT Filed: Aug. 8, 2016

(86) PCT No.: PCT/IB2016/054767
§ 371 (c)(1),
(2) Date: Jan. 16, 2018

(87) PCT Pub. No.: WO2017/025888
PCT Pub. Date: Feb. 16, 2017

(65) Prior Publication Data
US 2018/0203134 A1   Jul. 19, 2018

Related U.S. Application Data

(60) Provisional application No. 62/202,397, filed on Aug. 7, 2015.

(51) Int. Cl.
*G01T 1/20* (2006.01)
*B82Y 15/00* (2011.01)
*G01T 1/161* (2006.01)

(52) U.S. Cl.
CPC ............ *G01T 1/2018* (2013.01); *B82Y 15/00* (2013.01); *G01T 1/161* (2013.01)

(58) Field of Classification Search
None
See application file for complete search history.

(56) References Cited

U.S. PATENT DOCUMENTS

| 9,000,382 B2 | 4/2015 | Mattson |
| 2006/0141708 A1* | 6/2006 | Kim ............... H01L 21/28282 438/259 |

(Continued)

FOREIGN PATENT DOCUMENTS

| WO | 2009/083852 | 7/2009 |
| WO | 2014/087295 | 6/2014 |

(Continued)

OTHER PUBLICATIONS

Madl et al., "Respiratory Toxicology: 8.22.5.7: Engineered Metal Nanoparticles" pub. 2010 [Retrieved from internet Jun. 10, 2019] Retrieved from url<https:www.sciencedirect.com/topics/chemistry/nanoparticle-quantum-dot>. (Year: 2010).*

(Continued)

*Primary Examiner* — Yara B Green
(74) *Attorney, Agent, or Firm* — Larry Liberchuk

(57) ABSTRACT

A radiation detection system of an imaging system (100) includes a radiation sensitive detector array (112). The array includes a detector pixel with an optically transparent encapsulate material (114) with one or more particles (116) supporting one or more different scintillation materials (118), wherein each scintillation material is in the form of a nanometer to micrometer quantum dot. A method includes receiving radiation with a detector pixel, wherein the detector pixel includes an encapsulate with one or more quantum dots, wherein each of the quantum dots includes a scintillation material, generating, with the detector pixel, a signal indicative of the received radiation, and reconstructing the signal to construct an image.

28 Claims, 7 Drawing Sheets

(56) References Cited

U.S. PATENT DOCUMENTS

| | | |
|---|---|---|
| 2007/0085010 A1 | 4/2007 | Letant |
| 2008/0237470 A1* | 10/2008 | Loureiro .................. G01T 1/16 250/361 R |
| 2010/0001209 A1 | 1/2010 | Osinski |
| 2010/0264322 A1 | 10/2010 | Levene |
| 2011/0192981 A1* | 8/2011 | Menge .................. G01T 1/203 250/362 |
| 2012/0175584 A1 | 7/2012 | Weinberg |
| 2013/0187053 A1 | 7/2013 | Colby |

FOREIGN PATENT DOCUMENTS

| | | |
|---|---|---|
| WO | 2014/147570 | 9/2014 |
| WO | 2016/046216 | 3/2016 |

OTHER PUBLICATIONS

Urdaneta, et al., "Quantum Dot Composite Radiation Detectors", Photodiodes—World Activities in 2011.

\* cited by examiner

QUANTUM DOT BASED IMAGING DETECTOR

CROSS REFERENCE TO RELATED APPLICATIONS

This application is the U.S. National Phase application under 35 U.S.C. § 371 of International Application No. PCT/IB2016/054767, filed Aug. 8, 2016, published as WO 2017/025888 on Feb. 16, 2017, which claims the benefit of U.S. Provisional Patent Application No. 62/202,397 filed Aug. 7, 2015. These applications are hereby incorporated by reference herein.

FIELD OF THE INVENTION

The following generally relates to an imaging detector and more particularly to a quantum dot based imaging detector, and is described with particular application to computed tomography (CT); however, the following is also amenable to other imaging modalities such as positron emission tomography (PET).

BACKGROUND OF THE INVENTION

Computed tomography detection systems have employed scintillation/photodiode (indirect conversion) detectors. With these detectors, X-ray radiation incident on a scintillator are absorbed by scintillating material thereof, which in turn emits light photons that are detected by a photodiode, which in turn generates a signal indicative thereof. The scintillating material has included full size crystals, ceramics, or garnets. Unfortunately, these structures are generally rigid structures, limiting their shape. These structures are also relatively expensive.

Energy discrimination is achieved through stacking layers of different scintillation materials, which absorb in different energy bandwidths of the X-ray radiation. The stack, in general, goes from lower energy absorbing layers closer to the incident X-ray radiation to higher energy absorbing layers nearer to the photodiode. However, each additional layer increases the thickness of the detector and the amount of scintillating material and requires a photodiode. Unfortunately, this increases the overall cost of the detector and, hence, the CT scanner.

Direct conversion detectors include a direct conversion material that directly converts incident X-ray radiation to electrical signals indicative of the energy of the X-ray radiation. An example of a direct conversion material is Cadmium Zinc Telluride (CZT). Unfortunately, present day direct conversion materials are expensive and made from a solid crystal such that their shape is rigidly bound to the crystalline structure of the chosen medium. Furthermore, it takes time to grow the crystal, which adds cost to the manufacturing the direct conversion detector.

In view of at least the above, there is an unresolved need for another detector configuration.

SUMMARY OF THE INVENTION

Aspects of the present application address the above-referenced matters and others.

According to one aspect, a radiation detection system of an imaging system includes a radiation sensitive detector array. The array includes a detector pixel with an optically transparent encapsulate material with one or more particles supporting one or more different scintillation materials, wherein each scintillation material is in the form of a nanometer to micrometer quantum dot.

In another aspect, a method includes receiving radiation with a detector pixel, wherein the detector pixel includes an encapsulate with one or more quantum dots, wherein each of the quantum dots includes a scintillation material, generating, with the detector pixel, a signal indicative of the received radiation, and reconstructing the signal to construct an image.

In another aspect, an imaging system includes a radiation detection system, including a radiation sensitive detector array with a plurality of detector pixels, each detector pixel including an optically transparent encapsulate material with one or more particles with pores supporting one or more quantum dots, wherein the quantum dots include scintillation materials, and wherein at least two of the quantum dots have different scintillation materials.

Still further aspects of the present invention will be appreciated to those of ordinary skill in the art upon reading and understand the following detailed description.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION OF EMBODIMENTS

Figure 1:
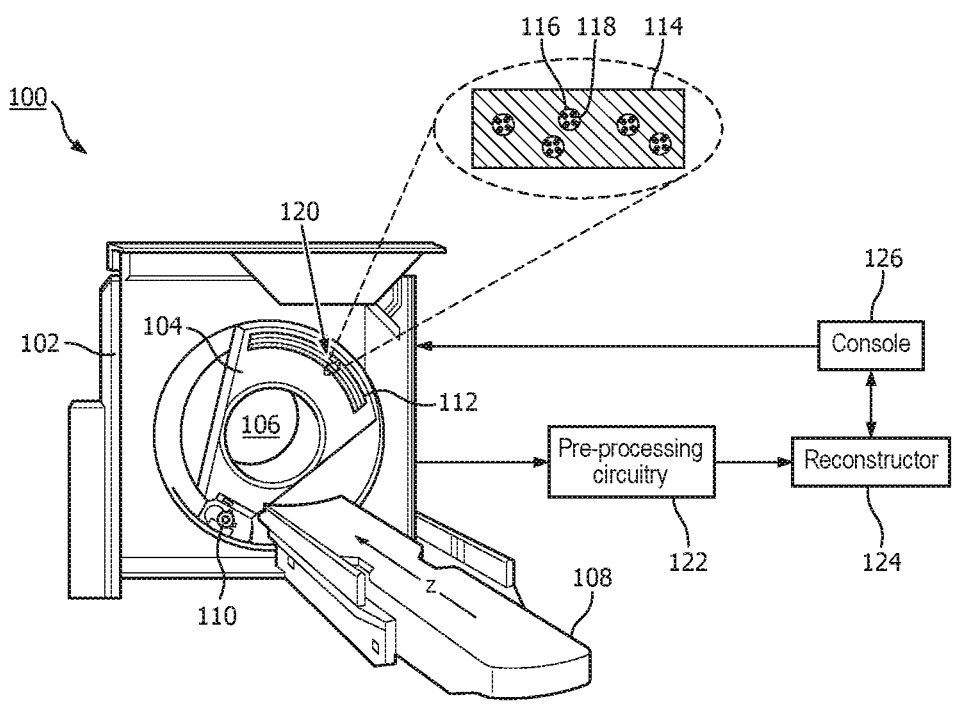
FIG. 1 schematically illustrates an example imaging system with a quantum dot based imaging detector array.

FIG. 1 schematically illustrates an example imaging system 100 such as a computed tomography (CT) system.

However, it is to be understood that the imaging system 100 could alternatively be a positron emission tomography (PET) system, an X-ray system, a hybrid CT/PET system, a hybrid CT/MR (magnetic resonance) system, a hybrid PET/MR system, and/or other imaging system configured to detect radiation in one or more energy bands and indirectly or directly convert the detected radiation to an electrical signal indicative thereof.

The imaging system 100 includes a generally stationary gantry 102 and a rotating gantry 104, which is rotatably supported by the stationary gantry 102. The rotating gantry 104 rotates around an examination region 106 about a longitudinal or z-axis. A subject support 108 such as a couch supports a human or animal patient or an object in the examination region 106. The subject support 108 is movable in coordination with scanning so as to guide the subject or object with respect to the examination region 106 for performing a scan of the subject or object. A radiation source 110, such as an x-ray tube, is supported by the rotating gantry 104 and emits poly-energetic/chromatic radiation.

A radiation sensitive detector array 112 includes a plurality of detector pixels 120 that detect X-ray radiation traversing the examination region 106. The radiation sensitive detector array 112 may include one or more rows of the detector pixels 120 arranged with respect to each other along the z-axis direction. In one instance, the radiation sensitive detector array 112 includes an indirect conversion based pixel 120 with a scintillation material that receives X-ray radiation and converts the X-ray radiation to light, and a corresponding photosensor that senses the light and generates an electrical signal indicative of the received radiation. In another instance, the radiation sensitive detector array 112 includes a direct conversion based pixel 120 that receives X-ray radiation and directly converts the X-ray radiation to the electrical signal.

The scintillation and/or direct conversion material includes an optically transparent and non-insulating encapsulate material 114 with one or more porous particles 116, which support one or more different scintillation materials 118 in the form of nanometer to micrometer quantum dots, embedded therein. Different groups of the different the quantum dots 118 are encapsulated is a same layer of the material 114 (e.g., as shown) or in different layers (e.g., FIG. 5, etc.) of the material 114. The quantum dots 118 can be tuned (e.g., via density, thickness, type of scintillation material, etc.) to absorb in different energy bandwidths (e.g., 20 keV to 140 keV) and generate characteristic radiation and/or electrical signals. As such, the detector array 112 described herein is well-suited for CT energy discrimination, without having to increase the amount of scintillation material and/or the photosensitive area, and the cost of the detector and/or scanner.

In one non-limiting instance, the encapsulate material 114 is melted, e.g., by applying heat and the quantum dots 180 are mixed into the melted encapsulate material 114. The resulting mixture is formed into a predetermined number of layers of interest (e.g., one or more). Each layer may conform to a predetermined shape of interest (a polyhedron, a sphere, a spheroid, a cylinder, etc.) of a rigid structure or a shape independent of any rigid structure as the small diameter quantum dots 118 render an amorphous or non-crystalline solid. The latter may allow for reduced production cost and time, and increasing detective quantum efficiency and/or spectral discrimination. An example of the particle 116 is described in application serial number EP 14186022.1, entitled "Encapsulated materials in porous particles," and filed on Sep. 23, 2014, the entirety of which is incorporated herein by reference.

Pre-processing circuitry 122 processes the signal from the detector array 112. For example, where the detector array 112 is a scintillator/photodiode based detector array a pulse shaper processes the signal (which can first be amplified) and generates a pulse (e.g., voltage, current, etc.) having a height indicative of the energy of the detected radiation. Where the detector array 112 includes a direct conversion detector material, each pixel directly generates and outputs the pulse. In either case, an energy discriminator energy-discriminates the pulse through, e.g., one or more comparators, each having a different energy threshold, which correspond to an energy of interest. A counter increments a count value for each threshold based on the output of the energy discriminator. A binner energy-bins the signals and, hence, the radiation, into two or more energy bins based on the counts, wherein an energy bin encompasses an energy window.

A reconstructor 124 is configured to selectively reconstruct the detected signals. In one instance, the reconstructor 124 reconstructs signals for a particular energy range. For instance, the reconstructor 124 can reconstructs signals one or more energies or energy ranges in the diagnostic range of 20 keV to 140 keV. In another instance, the reconstructor combines the signals for all of the bins and reconstructs the combined signal to generate a conventional image over the energy spectrum of the emitted radiation. An operator console 126 includes a human readable output device such as a monitor or display and an input device such as a keyboard and mouse. Software resident on the console 126 allows the operator to interact with the scanner 100 via a graphical user interface (GUI) or otherwise. This interaction may include selecting a type of scan, selecting an imaging protocol, initiating scanning, etc.

FIGS. 2-10 illustrate an example of a scintillator/photodiode pixel 120. It is to be understood that the illustrated geometries and quantum dot density and size are for explanatory purposes and are not limiting.

Figure 2:
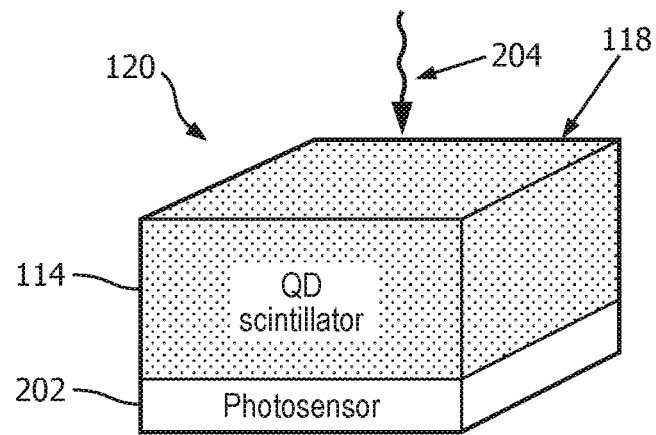
FIG. 2 schematically illustrates an example of a pixel of the quantum dot based imaging detector for a scintillator/photosensor configuration with a single scintillation layer.
Figures 3A, 3B:
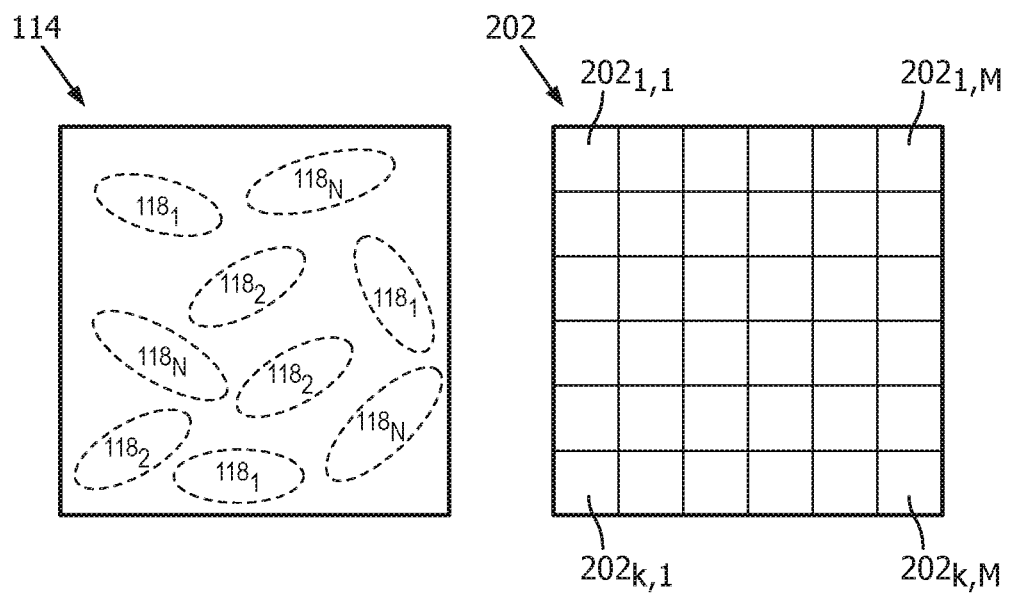
FIG. 3A schematically illustrates a top down view into the single scintillation layer of FIG. 2.
FIG. 3B schematically illustrates a top down view into the photosensor of FIG. 2.

In FIG. 2, the material 114 is a single cube shaped block of scintillation material 114 ("QD SCINTILLATOR"). In this example, the particles 116 and hence the quantum dots 118 (shown as black dots in FIG. 2) are distributed homogeneously in the single cube shaped block of scintillation material 114. FIG. 3A shows a top down view with quantum dots $118_1, 118_2, \ldots, 118_N$ (where N is an integer greater than one) distributed homogeneously therein. Returning to FIG. 2, the block of material 114 is optically coupled to a photosensor 202. The optical coupling may include an optical adhesive. A reflective material may be disposed on and/or next to the other sides to direct light photons traversing away from the photosensor 202 to the photosensor 202.

FIG. 3B shows the photosensor 202 with a matrix of radiation sensitive regions $(202_{1,1}, \ldots, 202_{1,M}, \ldots, 202_{K,1}, \ldots 202_{K,M})$. In this example, each of the regions $(202_{1,1}, \ldots, 202_{1,M}, \ldots, 202_{K,1}, \ldots 202_{K,M})$ corresponds to one of a set of predetermined energy bands of interest. The encapsulate material 114 absorbs incident X-ray photons 204 of different energy via the different quantum dots 118 and emits characteristic radiation indicative thereof. The regions $(202_{1,1}, \ldots, 202_{1,M}, \ldots, 202_{K,1}, \ldots 202_{K,M})$ of the photosensor 202 sense corresponding emitted light and generate electrical signal indicative thereof. The electrical signals are routed to the pre-processing circuitry 122, which processes as described herein and/or otherwise.

Figure 4:
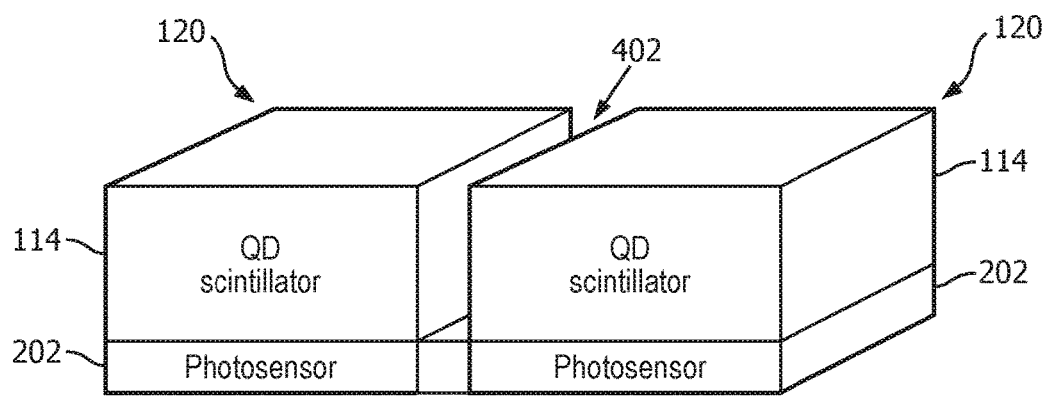
FIG. 4 schematically illustrates two adjacent scintillator/photosensor pixels formed with spacing therebetween.

FIG. 4 shows two adjacent scintillator/photodiode pixels 120. With this embodiment, a barrier 402 between the QD scintillators of scintillator/photodiode pixels 120 can be included in the deposition or formation process of the material 114. This mitigates any need for subsequently sawing of such a barrier after the formation of the scintillator, e.g., as done with gadolinium oxysulfide (GOS), garnet, and/or other rigid scintillator scintillators. In general, the barrier 402 can be filled with a reflective paint to mitigate cross-talk between the scintillator/photodiode pixels 120 and direct light photons to the corresponding photosenors 202.

Figure 5:
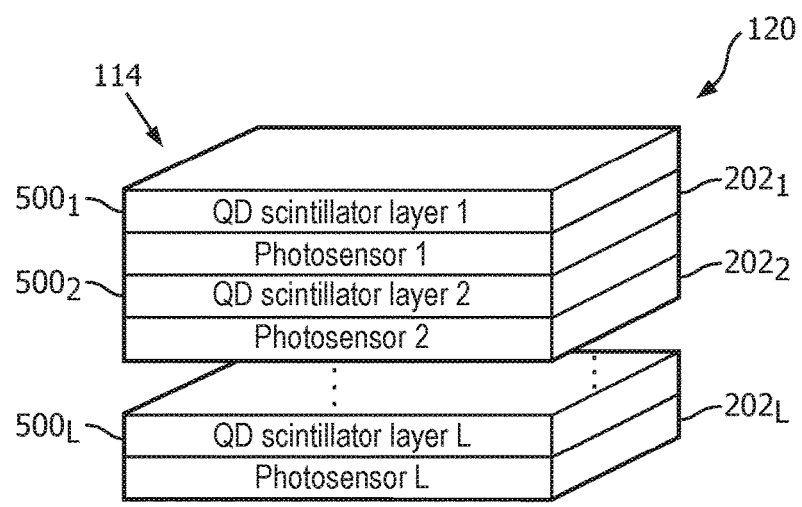
FIG. 5 schematically illustrates an example of a pixel of the quantum dot based imaging detector for a scintillator/photosensor configuration with multiple scintillation layers.
Figure 6:
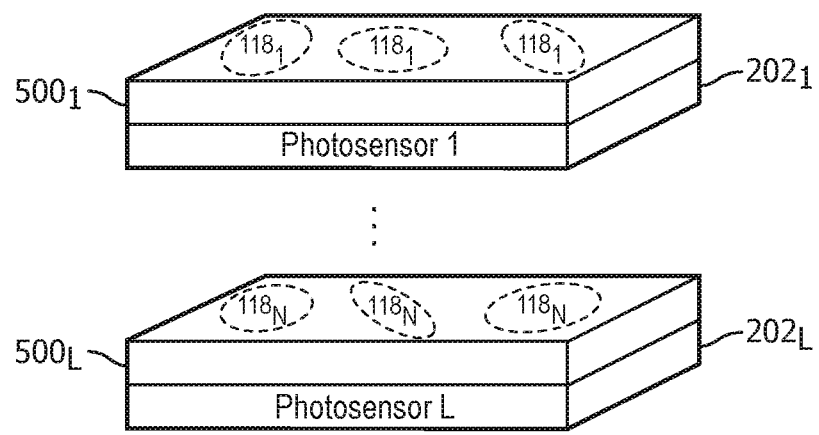
FIG. 6 schematically illustrates example scintillation layers of the configuration of FIG. 5.

Turning to FIGS. 5 and 6, the material 114 of the pixel 120 includes a plurality of QD scintillation layers $500_1$, $500_2$, . . . , $500_L$ (where L is an integer greater than one), each with one of the groups of quantum dots $118_1$, . . . , $118_N$ having the same absorption and emission characteristics. The photosensor 200 includes a plurality of photosensor $202_1$, $202_2$, . . . , $202_L$. Each one of the QD scintillation layers $500_1$, $500_2$, . . . , $500_L$ is coupled to a corresponding one of the photosensors $202_1$, $202_2$, . . . , $202_L$. In another embodiment, the photosensors $202_1$, $202_2$, . . . , $202_L$ as coupled at a side of the QD scintillation layers instead of below the QD scintillation layers. Such a configuration is shown in U.S. Pat. No. 9,00,382, entitled "Spectral Imaging Detector," and filed on Oct. 29, 2009. In one instance, a thin slice of encapsulating material is disposed between each layer. In another instance, the layers are coupled without the thin slice of encapsulating material disposed therebetween. In general, the layers are ordered such that the incident X-rays strike the lowest energy layer first and the highest energy layer last. This configuration is scalable in that layers can be stack to achieve a spectral bandwidth of interest.

Figure 7:
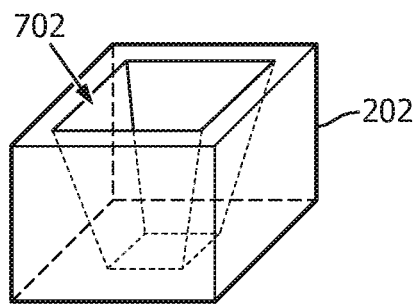
FIG. 7 schematically illustrates a pixel with a photosensor with a three dimensional photosensing surface.
Figure 8:
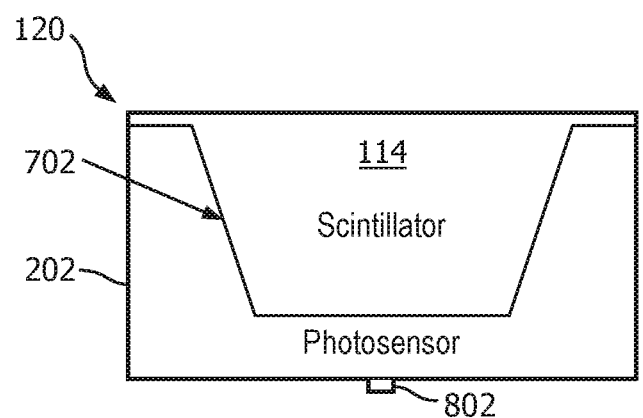
FIG. 8 schematically illustrates a cross-sectional view of the configuration of FIG. 7 with a single scintillation layer including quantum dots.

Turning to FIGS. 7 and 8, the photosensor 202 includes a recess 702 with a three-dimensional inner photosensitive surface or walls. In the illustrated example, the recess 702 has a square frustum shape. Other shapes are also contemplated herein. FIG. 8 shows cross-sectional view of the photosensor 202 of FIG. 7 with the material 114 disposed in the recess 702, where the material 114, conforms to the shape of the recess 702. In FIG. 8, the material 114 is a single layer and includes a plurality of quantum dots with the same absorption and emission characteristics. An example of a photosensor having this shape is described in Publication WO 2014/087295 A1, entitled "Imaging Detector," and filed on Nov. 23, 2013, the entirety of which is incorporated herein by reference.

Figure 9:
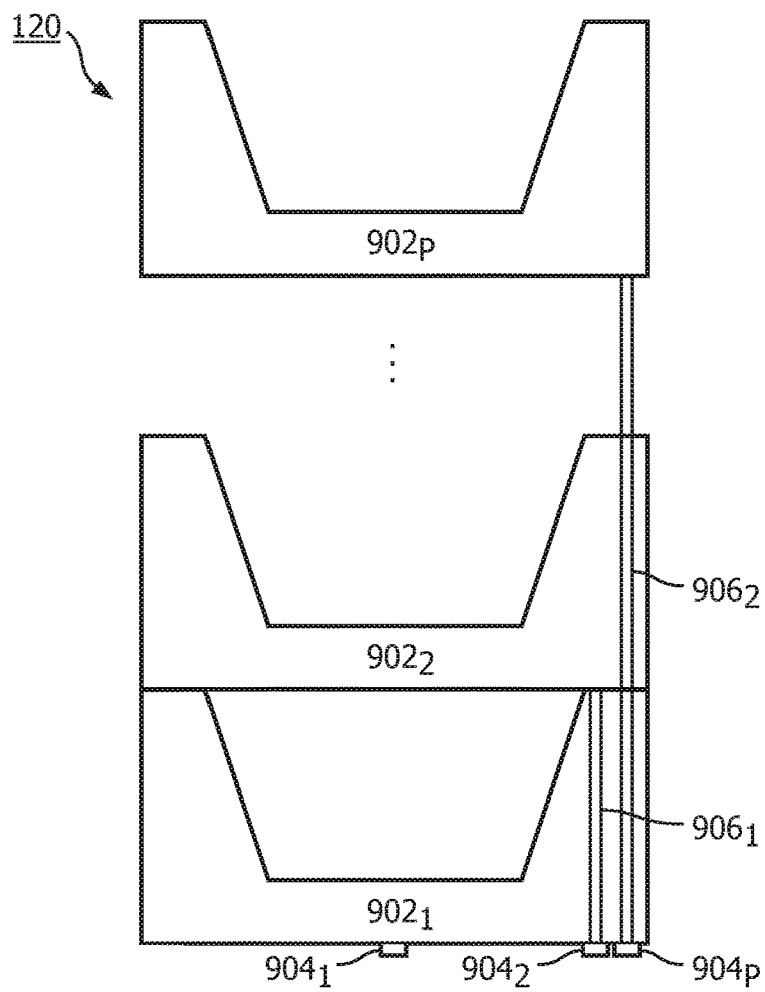
FIG. 9 schematically illustrates a variation of FIG. 7 with stacked pixels forming a multi-energy configuration.

FIG. 9 illustrates a pixel 120 with a plurality of bonded direct conversion elements $902_1$, $902_2$, . . . , $902_p$ (where P is an integer) stacked in a vertical configuration, providing a multi-energy (spectral) configuration. In this example, each of the direct conversion elements $902_1$, $902_2$, . . . , $902_p$ includes a porous silicon with the quantum dots 118 in the pores, where the quantum dots 118 for the different direct conversion elements $902_1$, $902_2$, . . . , $902_p$ have different absorption and emission characteristics. The direct conversion elements $902_1$, $902_2$, . . . , $902_p$ are shaped similar to the photosensor 202 of FIG. 7 with a recess and a three-dimensional sensing surface.

The direct conversion element $902_1$ is tuned to a first (highest) energy band and is in electrical contact with an (read out) electrode $904_1$. The direct conversion element $902_2$ is tuned to a different energy band and is in electrical contact with an (read out) electrode $904_2$, which extends through the direct conversion element $902_1$ through a via $906_1$. The direct conversion element $902_p$ is tuned to yet another (lowest) energy band and is in electrical contact with an (read out) electrode $904_p$, which extends through the direct conversion elements $902_1$ and $902_2$ through a via $906_2$. In the illustrated embodiment, the recess is empty. In another embodiment, the recess is filled with a filler material.

Figure 10:
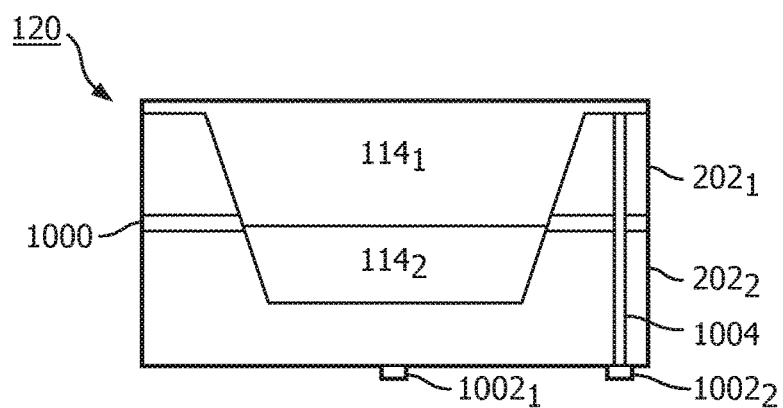
FIG. 10 schematically illustrates a variation of FIG. 8 for a dual energy configuration with two scintillation layers.

FIG. 10 illustrates a dual energy variation of FIG. 8. In FIG. 10, the material 114 includes layers $114_1$ and $114_2$, respectively corresponding to photosensor regions $202_1$ and $202_2$ which are separated by an isolation layer 1000. The layers $114_1$ and $114_2$ include quantum dots having different absorption and emission characteristics, and the regions $202_1$ and $202_2$ have different spectral sensitivities. Each of the regions $202_1$ and $202_2$ has its own read out electrical electrodes $1002_1$ and $1002_2$, where the electrode $1002_2$ is routed through the region $202_2$ to the region $202_1$ through a via 1004. An example of a multi energy pixel configuration with this shape is described in Publication WO 2014/087295 A1, entitled "Imaging Detector," and filed on Nov. 23, 2013, the entirety of which is incorporated herein by reference.

Figure 11:
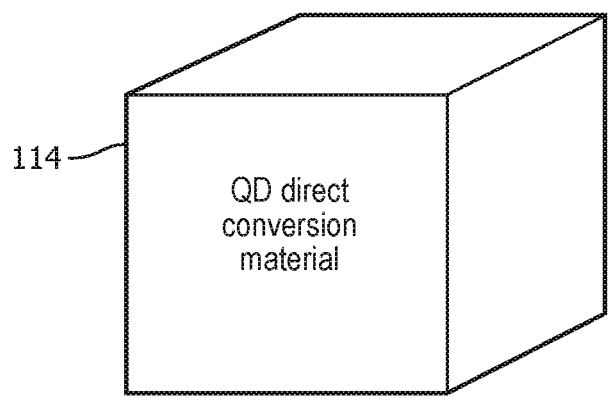
FIG. 11 schematically illustrates an example of a single block pixel for a direct conversion configuration.
Figure 12:
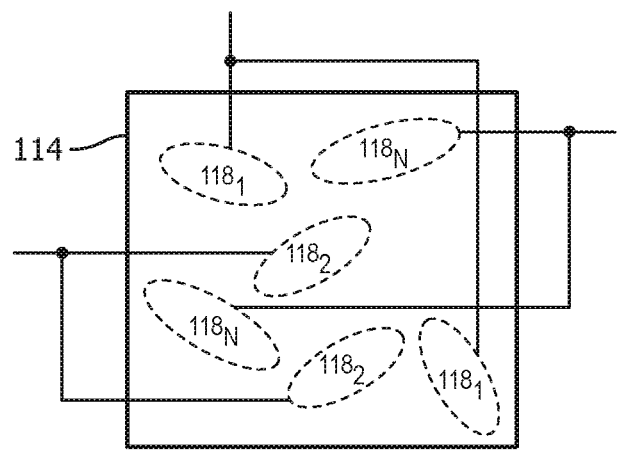
FIG. 12 schematically illustrates an example of routing signals from the quantum dot of FIG. 11.

FIG. 11 illustrates an example of the material 114 configured as a direct conversion pixel. Similar to FIG. 2, in this embodiment quantum dots corresponding to different energy bandwidths and distributed throughout a single layer. FIG. 12 shows exemplary read out from the individual particles 116, in which the output of particles corresponding to the same energy bandwidth are routed to the same path, with particles for different energy bandwidth routed to different paths.

Figure 13:
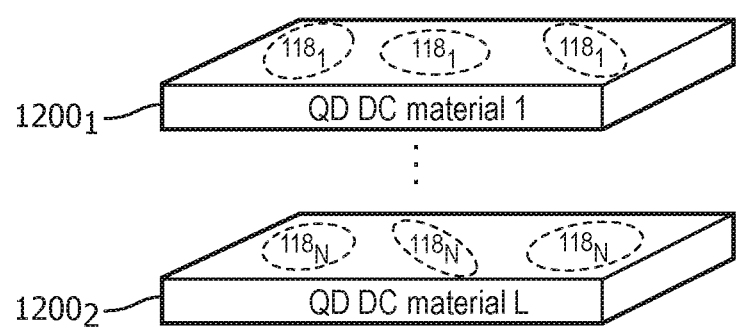
FIG. 13 schematically illustrates an example of a multiple layer pixel for a direct conversion configuration.

FIG. 13 illustrates an example of the material 114 configured as a direct conversion pixel where the quantum dots corresponding to different energy bandwidths are distributed in different layers. The ordering of the layers can be similar to that described in connection with FIGS. 5 and 9 and/or otherwise. Read out for each layer can be similar to that shown and described in connection with FIGS. 9 and 12 and/or otherwise.

With FIGS. 11 and 13, where the encapsulate material includes porous silicon, and the quantum dots 118 fill at least a portion of the pores of the silicon, electron-hole pairs therebetween, allowing for direct conversion of incident X-rays to the electrical signals. Quantum dots deposited in porous silicon enables a low cost direct conversion X-ray detector with very high QE due to increased surface area contact with the materials and increased responsivity when compared to other materials used for direct converters.

With respect to PET, the particles 116 instead include quantum dots 118 with a scintillation material that absorbs in the gamma radiation bandwidth. A single layer or stacked layers can be employed, as described herein. In general, a thickness of the material 114 for a PET application may be on the order of ten times a thickness of a material 114 for a CT application to absorb the higher energy radiation.

Figure 14:
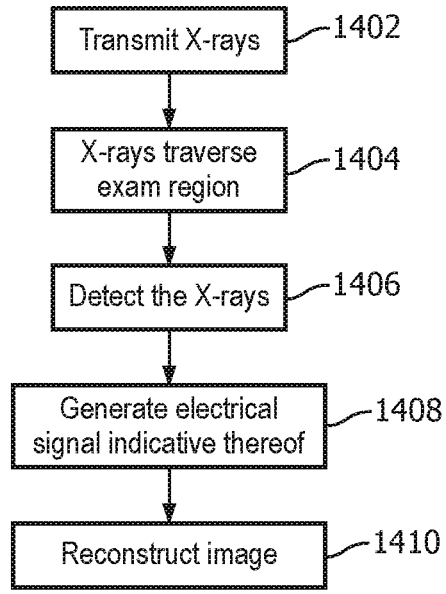
FIG. 14 illustrates an example method in accordance with an embodiment herein.

FIG. 14 illustrates imaging with the detector array 112.

It is to be appreciated that the ordering of the below acts is for explanatory purposes and not limiting. As such, other orderings are also contemplated herein. In addition, one or more of the acts may be omitted and/or one or more other acts may be included.

At 1402, transmission X-ray radiation is generated by an X-ray tube.

At 1404, the transmission radiation traverses an examination field of view.

At 1406, the detector array 112 detects the transmission radiation traversing the examination field of view. As described herein, the detector array 112 includes the material 114 with the quantum dots 118.

At 1408, an electrical signal indicative thereof is generated.

At 1410, the electrical signal is processed to generate an image of the examination field of view, including a portion of the patient therein.

Figure 15:
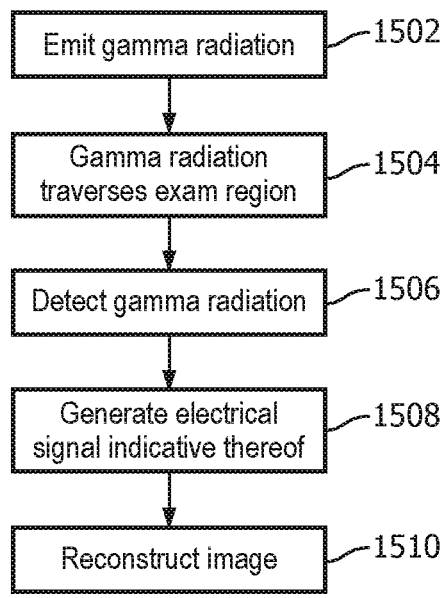
FIG. 15 illustrates another example method in accordance with an embodiment herein.

FIG. 15 illustrates imaging with the detector array 112.

It is to be appreciated that the ordering of the below acts is for explanatory purposes and not limiting. As such, other orderings are also contemplated herein. In addition, one or more of the acts may be omitted and/or one or more other acts may be included.

At 1502, gamma radiation is emitted by an agent ingested by a patient.

At 1504, the emission radiation traverses an examination field of view.

At 1506, the detector array 112 detects the emission radiation traversing the examination field of view. As described herein, the detector array 112 includes the material 114 with the quantum dots 118.

At 1508, an electrical signal indicative thereof is generated.

At 1510, the electrical signal is processed to generate an image of the examination field of view, including a portion of the patient therein.

The invention has been described herein with reference to the various embodiments. Modifications and alterations may occur to others upon reading the description herein. It is intended that the invention be construed as including all such modifications and alterations insofar as they come within the scope of the appended claims or the equivalents thereof.

The invention claimed is:

1. A radiation detection system of an imaging system, comprising:
　a radiation sensitive detector array, including:
　　a detector pixel including:
　　　an optically transparent encapsulate material with one or more particles supporting one or more different scintillation materials, wherein each scintillation material is in a form of a nanometer to micrometer quantum dot.

2. The radiation detection system of claim 1, wherein the one or more particles support different scintillation materials, each of the different scintillation materials having a different energy absorption bandwidth.

3. The radiation detection system of claim 2, wherein the optically transparent encapsulate material is a single scintillation layer and the one or more particles are in the single scintillation layer.

4. The radiation detection system of claim 3, further comprising:
　a photosensor, wherein the single scintillation layer is coupled to the photosensor.

5. The radiation detection system of claim 4, wherein the photosensor includes a matrix of photosensitive regions, with at least one region corresponding to each of the absorption bandwidths.

6. The radiation detection system of claim 2, further comprising:
　a second detector pixel, wherein the optically transparent encapsulate material of the detector pixel and wherein the optically transparent encapsulate material of the second detector pixel are separated by a material free region having a non-zero width.

7. The radiation detection system of claim 6, further comprising:
　a reflective material disposed in the material free region.

8. The radiation detection system of claim 2, wherein the optically transparent encapsulate material includes at least two layers, with a first of the different scintillation materials in a first of the layers and a second different one of the different scintillation materials material in a second of the layers.

9. The radiation detection system of claim 8, further comprising:
　a first photosensor coupled to the first of the different scintillation materials; and
　a second photosensor coupled to the second of the different scintillation materials.

10. The radiation detection system of claim 9, further comprising:
　a coupling layer between the first photosensor and the second of the different scintillation materials.

11. The radiation detection system of claim 10, wherein the photosensor includes a matrix of photosensitive regions, with at least one region corresponding to each of the absorption bandwidths.

12. The radiation detection system of claim 1, further comprising:
　a photosensor with a recess and a three-dimensional photosensing surface, wherein the optically transparent encapsulate material is disposed in the recess against the three-dimensional photosensing surface.

13. The radiation detection system of claim 12, further comprising:
　wherein the one or more particles support different scintillation materials, each different scintillation material having a different energy bandwidth, wherein the optically transparent encapsulate material includes at least two scintillation layers, with a first of the different scintillation materials in a first of the scintillation layers and a second different one of the different scintillation materials material in a second of the scintillation layers, and a photosensor therebetween.

14. The radiation detection system of an imaging system of claim 12, wherein a perimeter of the optically transparent encapsulate material follows a perimeter of the recess.

15. The radiation detection system of claim 1, wherein the optically transparent encapsulate material with the one or more particles supporting the one or more different scintillation materials is a direct conversion material which directly converts absorbed radiation into corresponding electrical signals indicative of an energy of the absorbed radiation.

16. The radiation detection system of claim 15, further comprising:
　a first electrical contact in electrical contact with each particle of a first group of the particles having a same first scintillation material; and
　a second electrical contact in electrical contact with each particle of a second group of the particles having a same second scintillation material.

17. The radiation detection system of claim 15, wherein the optically transparent encapsulate material includes porous silicon and the one or more particles are disposed in the pores of the porous silicon.

18. The radiation detection system of claim 17, wherein the one or more particles in the pores interact with the silicon to produce electron-hole pairs.

19. The radiation detection system of claim 1, wherein the one or more particles support different scintillation materials, each different scintillation material having a different spectral sensitivity, and the spectral sensitivity is in a range of 20 keV to 120 keV.

20. The radiation detection system of claim 1, wherein the one or more particles support different scintillation materials, each different scintillation material having a different spectral sensitivity, and the spectral sensitivity is in a range of 480 keV to 520 keV.

21. The radiation detection system of claim 20, wherein the optically transparent encapsulate material includes a plurality of sheets of silicon layers stack one on another.

22. A method, comprising:
receiving radiation with a detector pixel, wherein the detector pixel includes an encapsulate with one or more quantum dots, wherein each of the quantum dots includes a scintillation material;
generating, with the detector pixel, a signal indicative of the received radiation; and reconstructing the signal to construct an image.

23. The method of claim 22, wherein at least two of the quantum dots include different scintillation materials corresponding to different energy spectra and the at least two quantum dots are all in a same layer of the encapsulate, and further comprising:
generating, with a first region of a photosensor coupled to the encapsulate, a first signal corresponding to a first of the at least two the quantum dots;
generating, with a second region of the photosensor, a second signal corresponding to a second of the at least two the quantum dots; and
reconstructing the first signal to construct a first spectral image and the second signal to construct a second spectral image.

24. The method of claim 22, wherein at least two of the quantum dots include different scintillation materials corresponding to different energy spectra and the at least two quantum dots are all in different layers of the encapsulate, and further comprising:
generating, with a first region of a photosensor coupled to the encapsulate, a first signal corresponding to a first of the at least two the quantum dots;
generating, with a second region of the photosensor, a second signal corresponding to a second of the at least two the quantum dots; and
reconstructing the first signal to construct a first spectral image and the second signal to construct a second spectral image.

25. The method of claim 22, wherein at least two of the quantum dots include different scintillation materials corresponding to different energy spectra and the at least two quantum dots are all a same layer of a porous silicon material, and further comprising:
generating, via the porous silicon material, a first signal corresponding to a first of the at least two the quantum dots;
generating, via the porous silicon material, a second signal corresponding to a second of the at least two the quantum dots; and
reconstructing the first signal to construct a first spectral image and the second signal to construct a second spectral image.

26. The method of claim 22, wherein the quantum dots include a same scintillation material disposed over a three-dimensional photosensing surface, and further comprising:
generating, with a first region of a photosensor coupled to the encapsulate, a first signal corresponding to a first of the at least two the quantum dots;
generating, with a second region of the photosensor, a second signal corresponding to a second of the at least two the quantum dots; and
reconstructing the first signal to construct a first spectral image and the second signal to construct a second spectral image.

27. The method of claim 22, wherein the quantum dots include a different scintillation material disposed in at least two layers over a three-dimensional photosensing surface, and further comprising:
generating, with a first region of a photosensor coupled to the encapsulate, a first signal corresponding to a first of the at least two the quantum dots;
generating, with a second region of the photosensor, a second signal corresponding to a second of the at least two the quantum dots; and
reconstructing the first signal to construct a first spectral image and the second signal to construct a second spectral image.

28. An imaging system, comprising:
a radiation detection system, including a radiation sensitive detector array with a plurality of detector pixels, each detector pixel including an optically transparent encapsulate material with one or more particles with pores supporting one or more quantum dots, wherein the quantum dots include scintillation materials, and wherein at least two of the quantum dots have different scintillation materials.

* * * * *